United States Patent [19]

Vehrs, Jr.

[11] 3,898,654
[45] Aug. 5, 1975

[54] AMTI RADAR SYSTEM

[75] Inventor: Charles L. Vehrs, Jr., Anaheim, Calif.

[73] Assignee: Rockwell International Corporation, El Segundo, Calif.

[22] Filed: Oct. 26, 1966

[21] Appl. No.: 589,541

[52] U.S. Cl.................................. 343/7 A; 343/7.7
[51] Int. Cl.²............................................ G01S 9/42
[58] Field of Search............................ 343/7.7, 7 A

[56] References Cited
UNITED STATES PATENTS

| | | | |
|---|---|---|---|
| 3,408,647 | 10/1968 | Dynan et al. | 343/7.7 |
| 3,465,336 | 9/1969 | Fishbein et al. | 343/7.7 |
| 3,775,768 | 11/1973 | Lisle et al. | 343/7.7 |

*Primary Examiner*—T. H. Tubbesing
*Attorney, Agent, or Firm*—L. Lee Humphries; Rolf M. Pitts

[57] ABSTRACT

In a non-coherent airborne moving target indicator, doppler processing means for providing a substantially clutter-free target signal. The presence of at least one of a preselected spectral condition and a preselected radial extent condition, indicative of a substantially clutter-referenced signal state, is determined. Such determination is employed for gating control of gated filter means for providing a normally low-pass filtered doppler processor output in the absence of a substantial clutter reference and alternatively providing a high-pass filtered output during the presence of a substantial clutter content.

6 Claims, 5 Drawing Figures

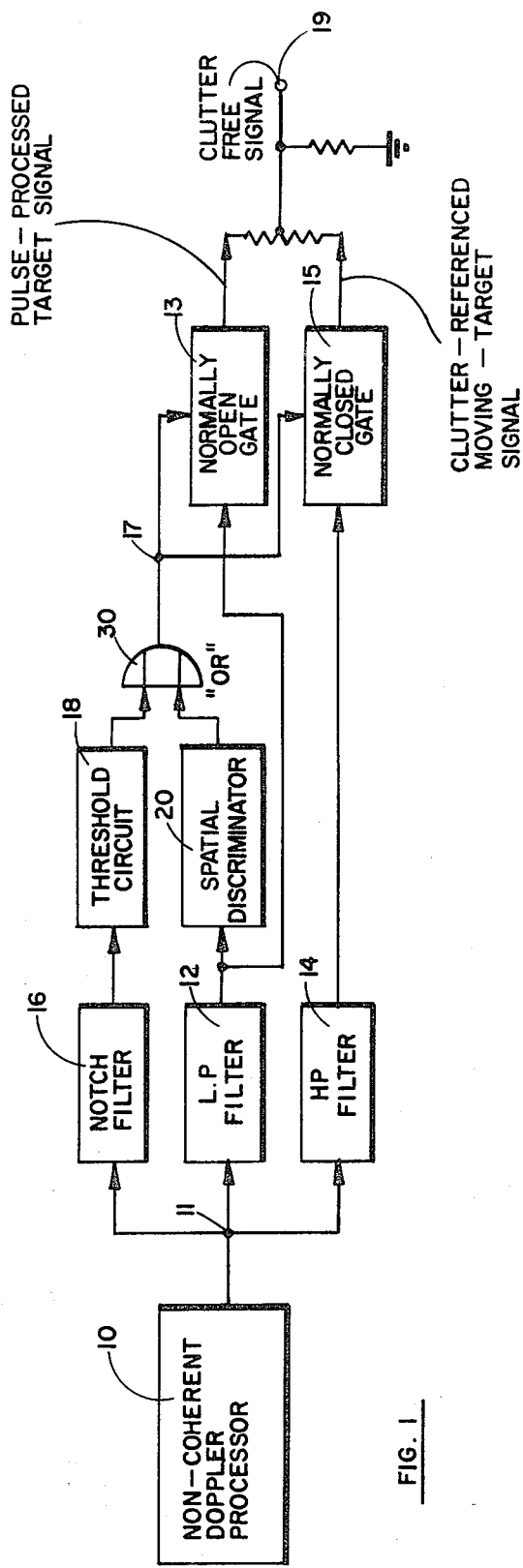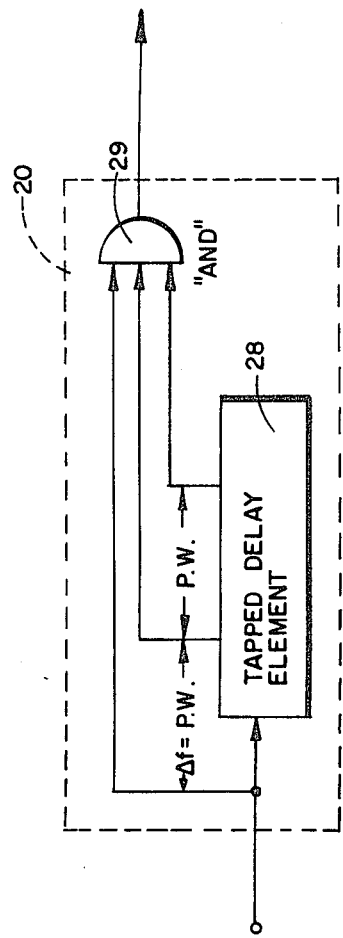
FIG. 1
FIG. 2
INVENTOR.
CHARLES L. VEHRS

INVENTOR.
CHARLES L. VEHRS

AMTI RADAR SYSTEM

The utility of a non-coherent doppler processor in a pulsed energy system, such as an airborne radar system, for the detection of moving targets, has been described in copending application Ser. No. 391,073 filed Aug. 18, 1964, now U.S. Pat. No. 3,408,647, for an AMTI Radar System, and assigned to North American Aviation, Inc., assignee of the subject patent application. The display of a substantially clutter-free moving target detected by means of an airborne radar system employing such non-coherent doppler processor relies on the presence of a substantial clutter content in the received signals, which gives rise to a clutter-referenced moving target signal which may be spectrally distinguished from the d-c, or low-frequencey, energy of the detected clutter content. For such purpose, a high-pass doppler filter is employed, having an upper corner frequency (or cut-off frequency) not exceeding one-half the pulse repetition interval of the pulsed energy system employing such device.

Where, however, the detected moving target is detected in a so-called clear-air mode, wherein substantially no clutter return occurs at the target range and within the sensor beamwidth, then the detected outut of the non-coherent doppler processor will be a d-c, or low frequency, signal corresponding to the detected moving target. In such case, the high-pass doppler filter will attenuate, or reject, the moving target signal, and such signal-of-interest is lost.

Although manual switching means may be provided for the human operator to manually swtich the doppler filter in and out of the signalling circuit, based upon the changes effected to the display provided by a display indicator, the results so achieved are limited by the limited skill and discrimination of the operator. Also, where the clutter patches are small relative to the azimuthal scan rate of the utilizing pulsed energy system, or vary along a given range trace interval which includes a moving target of interest, the operator is unable to provide adequate switching speeds and switching accuracy for providing a substantially clutter-free moving target indication.

Automatic mode switching has been provided in the prior art for distinguishing a target signal having substantial clutter content from one that is substantially free of clutter for suitably switching from a normal video signal to MTI video for display purposes. Such distinction or switching criteria is based on the preselected radial extent of a detected target, corresponding to three or more pulsewidths of the transmitted energy pulses. In other words, where a video signal indicative of received echoes of transmitted pulses, has a duration in excess of the transmitted pulsewidth (say, three pulsewidths), such echo return is presumed due to the larger radial extent of a clutter source and not due to a discrete, or small, moving target of interest. Accordingly, upon the determination of the existence of such clutter content in the received signal, the input of the display indicator is automatically switched from the ordinary video receiver signal to the doppler-processed signal or MTI video in order to provide a substantially clutter-free display. A fuller description of such technique is described in U.S. Pat. No. 3,121,870 issued to Mortley for Pulsed Radar Systems and U.S. Pat. No. 3,080,557 to Davis for Automatic Video Switching Device.

A disadvantage of such prior art automatic video switching to an MTI mode in response to a received echo signal having a duration greater than the transmitted pulsewidth, is that such switching criteria ignores those conditions where the clutter return may comprise clutter patches or samples of radial extends corresponding to less than three pulsewidths in length, although comprising a substantial clutter content within the corresponding portion of the range trace signal. In such event, the prior art spatial-extent responsive switch would remain in the so-called normal or "clear air" mode, resulting in such clutter patches being displayed and interpreted as clutter-free targets, even though no discrete moving existed within such portion of the range trace signal.

A second disadvantage of such prior art switching techniques is that such switching criteria may undesirably respond to those conditions where a group of discrete moving targets in consort, such as a flying formation of aircraft, occupy a radial extent corresponding to more than one pulsewidth, and occur in a clear-air mode (i.e., are detected in the absence of clutter at such direction and range interval). In such event, the prior art spatial-extent responsive switch would respond by switching to the MTI mode, resulting in such target returns being attenuated as clutter rather than being displayed. In other words, the presence of such group of moving targets may escape detection by the observer of such prior art system.

By means of the concept of the subject invention, limited bandpass means is employed for switching of a non-coherent AMTI processor to determine whether the spectral edge of the clutter content of a clutter referenced signal is present, thereby avoiding the limitations and disadvantages of the prior art.

In a preferred embodiment of the invention there is provided a non-coherent doppler signal processor adapted for use in an airborne pulsed energy system, such as a radar system. There is further provided apparatus having an input terminal adapted to be connected to the output of the non-coherent doppler signal processor for providing a substantially clutter-free target signal and comprising means for determining the presence of at least one of a preselected spectral condition and a preselected radial extent condition, indicative of a substantially clutter referenced signal state. Gated filter means is responsively coupled to the input terminal for providing a normally low-pass filtered output in the absence of a substantial clutter content in the input thereto, the gating means having a gate control input responsively coupled to an output of the first mentioned means for alternatively providing a high pass filtered output during the presence of a substantial clutter content in the input thereto.

In normal operation of the above-described arrangement, limited bandpass filter means determines the presence of the spectral edge of the clutter-content of a clutter-referenced signal regardless of its radial extent. Accordingly, proper mode switching may be achieved even for clutter patches less than a preselected integer number of pulsewidths in duration. Also, because a flying formation of discrete targets will no more display the spectral spread of the clutter content of a clutter-referenced signal than will a single discrete moving target, such limited bandpass means avoids improperly switching to an AMTI mode in response to clear air mode detection of such a moving formation.

Accordingly, it is an object of the subject invention to provide improved clutter-free display of moving targets.

It is another object of the invention to provide means for enhancing the utility of non-coherent doppler processors and avoiding the complexities of compensated coherent coppler processors.

It is yet another object of the subject invention to provide improved automatic video mode switching means in an airborne moving target indicator system.

A further object of the invention is to provide means for spectrally distinguishing between a clutter-referenced clutter content and a target detected in the absence of clutter, in a non-coherent receiver.

These and other objects of the invention will become apparent from the following description, taken together with the accompanying drawings in which:

FIG. 1 is a block diagram of a system embodying the concept of the invention;

FIG. 2 is a schematic arrangement of the spatial descriminator of FIG. 1; and

In the figures, like reference characters refer to like parts.

Figure 3A:
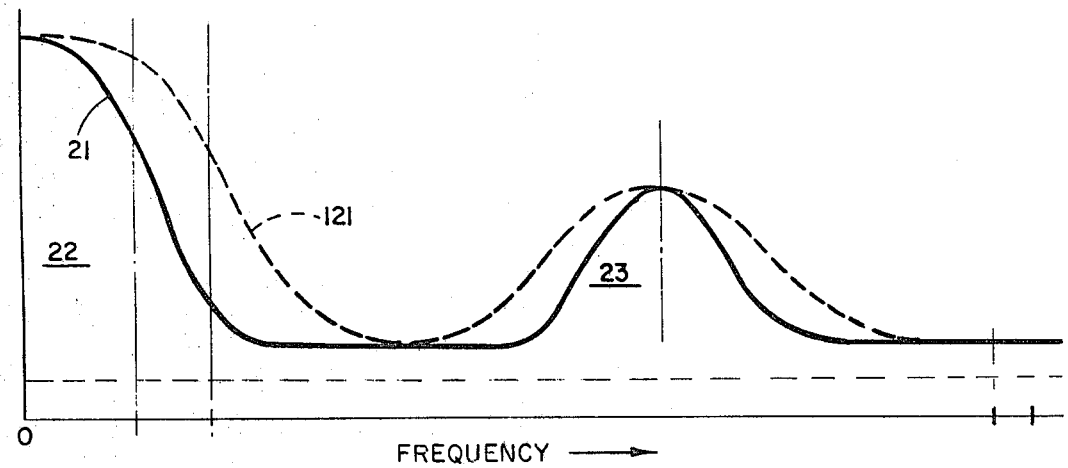
FIGS. 3a, 3b and 3c are a family of spectral diagrams illustrating a clutter-referenced noncoherent receiver signal, a clutter-free or clear-air mode detected target signal, and the bandpass regions of the filters of FIG. 1, respectively.

Referring to FIG. 1, there is illustrated a block diagram of a system embodying the concept of the invention. There is provided a non-coherent doppler signal processor 10 for processing a non-coherent video receiver signal of a pulsed energy system. Such processor 10 may be constructed and arranged, for example, substantially in accordance with the teachings of the above noted application Ser. No. 391,073.

The output of doppler processor 10 is a periodic range trace signal, the spectral content of which at each portion or range bin thereof corresponds to the time-averaged spectral content of a non-coherently detected signal, averaged over a preselected number of successive range traces.

There is also provided in FIG. 1 signalling means co-operating with processor 10 for providing a substantially clutter-free display signal and having an input terminal 11 connected to an output of processor 10. Such signalling means comprises normally gated-on low-pass filter means, a normally gated-off high pass filter means, an input of each of the filter means commonly coupled to form input terminal 11. The normally gated-on filter means is comprised of a low-pass filter 12 the output of which is gated by a normally-open gate 13; while the normally gated-off filter means comprises a high-pass filter 14, the output of which is gated by a normally closed gate 15.

There is further provided narrow bandpass, or notch, filter means 16 having a preselected center frequency corresponding to a frequency region intermediate the bandpass regions of the high-pass and low-pass filters 12 and 14, an input of notch filter 16 being coupled to input terminal 11. The gate control inputs of gates 13 and 15 are commonly connected to form a gate control signal input terminal 17 which is responsively coupled to the output of notch filter 16.

Figure 3B:
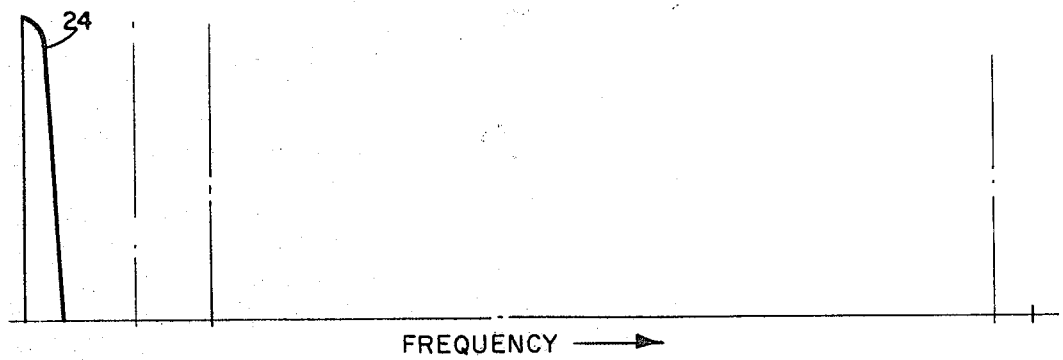
Figure 3C:
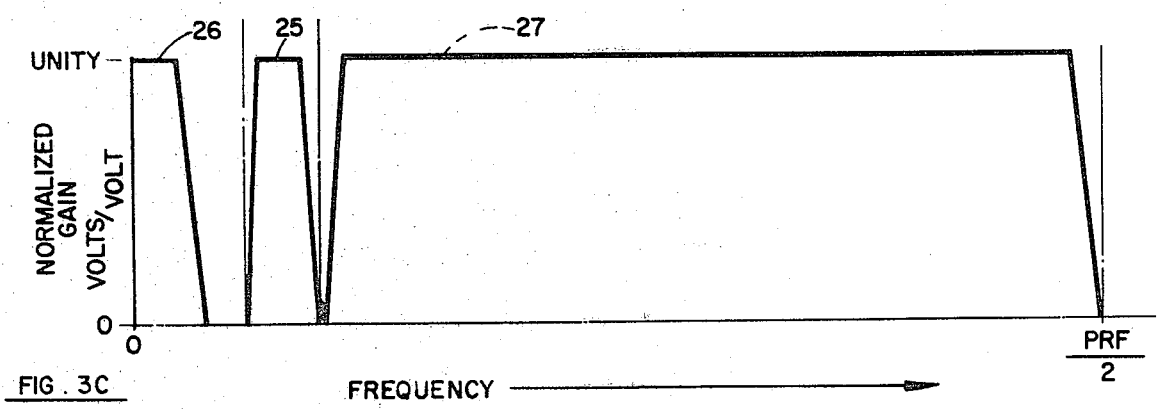

The operation of the above described arrangement to provide a substantially clutter-free display signal, may be more readily understood by aid of FIGS. 3a, 3b and 3c, which include a family of spectral diagrams of the responses of several elements in the arrangement of FIG. 1.

Curve 21 of FIG. 3a illustrates the spectral distribution of a substantially clutter-referenced signal (occurring at a selected portion or range bin of the periodic range trace signal output of processor 10), characterized by the larger clutter-cusp 22 occurring at d-c and low frequencies. The spectral width of the non-coherently detected clutter-referenced clutter return 22 is due to the angular beamwidth of the antenna of an airborne moving platform on which the doppler processor and a utilizing radar system are mounted, as is well understood in the art. Where the speed of the airborne moving platform is increased, relative to the clutter patch or terrain extent producing such clutter return, the spectral distribution of such clutter return is increased, as shown by dotted curve 121 and which secondary phenomenon is also well understood in the art. A detected target moving radially of the detecting radar system and relative to the clutter patch will produce a component signal (within such range bin) which contributes a second lesser spectral cusp 23, doppler-shifted relative to the clutter cusp 22, as is well understood in the art.

Although the spectral distribution of the clutter cusp 22 varies with antenna beamwidth, antenna look angle, and platform velocity, it is to be understood that in a given system and airborne application thereof there is a combination of minimum or fixed antenna beamwidth, minimum look-angle and minimum practical platform velocity which will give rise to a minimum spectral bandwidth of a clutter-referenced clutter return, corresponding to cusp 22 of FIG. 3a.

In the absence of a substantial clutter content in a non-coherently detected target signal, the spectral distribution of the detected target signal will be convolved about zero frequency or d-c, as illustrated by curve 24 in FIG. 3b. The narrower spectral extent, or narrower bandwidth, of the convolved clutter-free target signal is due to the lesser angular extent associated with the smaller size of such discrete target of interest, relative to that of a clutter patch which fills the antenna beamwidth, as is understood in the art. The wider bandwidth of the clutter-referenced target cusp 23 of FIG. 3a, relative to that of the clutter-free target return 24 of FIG. 3b, is due to the beating or mixing of the target return signal component with the clutter return, as is well understood in the art.

Because of the lesser spectral extent or bandwidth of a clutter-free non-coherently detected discrete target signal, relative to the bandwidth or spectral spread of a clutter-referenced clutter component of a non-coherently detected return (having a substantial clutter content), the two conditions corresponding to cusp 22 and curve 24 may be distinguished by observing the presence or absence of that spectral portion or edge of a clutter-referenced clutter cusp normally lying outside the bandwidth of a clutter-free non-coherent discrete target signal. Such spectral portion corresponds to the response bandwidth of notch filter 16 of FIG. 1, which response is illustrated in FIG. 3c as curve 25.

In normal operation of the device of FIG. 1 in the absence of a substantial clutter return, corresponding to the detection of a discrete target is a so-called "clear-air" mode, the receiver signal on terminal 11 is essentially a narrow bandpass low-frequency signal, corresponding to curve 24 of FIG. 3b. Such signal produces not output at either notch filter 16 or high-pass filter 14, being outside the bandpass of both of them (curves 25 and 27 in FIG. 3c). Instead, such clutter-free signal is transmitted through low-pass filter 12 and normally-open (ON-state) gate 13 to output terminal 19. When, however, notch filter 16 (in FIG. 1) provides an output signal above a preselected threshold (as determined by a threshold circuit 18) such output is applied at terminal 17 as indicative of a clutter-referenced signal condition, corresponding to that illustrated by curve 21 or curve 121 in FIG. 3a. Such signal condition closes normally open gate 13 opens normally-closed gate 15. Under such combination of conditions, the output of low-pass filter 12, the bandwidth of which (curve 26 in FIG. 3c) is at least as large as that of curve 24 (of FIG. 3b) and has a corner frequency or upper cut off frequency below the bandpass 25 of notch filter 16, is switched-off at output terminal 19 of FIG. 1. Concomitantly, the output of doppler filter 14, the bandwidth of which corresponds to a lower corner frequency above the bandpass 25 of notch filter 16 and an upper corner, or cut-off, frequency below one-half the system pulse repetition frequency (PRF) as illustrated in FIG. 3c by curve 27, is switched-on at output terminal 19. In this way, the clutter cusp 22 of a clutter referenced signal return is attenuated by the bandpass 27 of high-pass filter 14 to provide a substantially clutter-free output on terminal 19. If a doppler-shifted component (doppler-shifted relative to the clutter return 22) is included in the received signal and corresponding to a discrete moving target of interest, such component will be translated from terminal 11 (in FIG. 1) through doppler filter 14 and the switched-open (ON state) gate 15 to appear as a clutter-free signal of interest.

Hence, it is to be appreciated that a non-coherent doppler processor may be switched to provide a clutter-free display signal in response to target signals detected either in the presence or absence of substantial clutter. Because the output of the doppler processor 10 may be employed under both conditions of clutter and no-clutter, the pulse-to-pulse signal integration (or time-averaging within each range-bin) for improved signal-to-noise performance of the doppler processor, is retained in the "clear-air" detection mode as well as in the clutter-referenced, or AMTI, mode. Also, because the inventive switching concept relies on the spectral distinction between a non-coherent clutter reference and a clutter-free discrete target return, a clutter-free display signal may be obtained for a discrete moving target detected within a clutter patch having a radial extent no larger than one or two transmitted pulsewidths.

Although the invention has been described in terms of its application to an airborne non-coherent pulsed radar system, it is understood that the concept of the invention is not so limited and contemplates cooperation with and utilization in any type of pulsed energy system, such as, for example, a sonar type system or a laser doppler system.

Although the concept of the invention has been described as means for spectrally distinguishing the clutter reference of a clutter-referenced signal from a clutter-free non-coherent target return, without regard to the radial extent or time-duration of the signals being compared, the inventive concept is not necessarily exclusive of such spatial discrimination technique and in fact contemplates cooperating therewith, where desired. For example, a spatial discriminator 20 responsively coupled to the output of low pass filter 12 in FIG. 1, may enable the determination of a zero frequency signal component having a time duration of at least three or four (or any preselected number of) transmitted pulsewidths, and corresponding to a preselected radial extent. The output of such spatial discriminator may be a two-state signal indicative of the presence or absence of a preselected radial extent in the low-frequency component of a non-coherent receiver signal.

The construction and arrangement of spatial discriminator 20 is shown schematically in FIG. 2 as comprising a tapped delay line 28, the intervals between adjacent ones of a preselected number of taps corresponding to a single transmitted pulsewidth, and the preselected number of taps corresponding to a preselected radial extent, selected as distinguishing a target of interest from other received signals. The tapped outputs of such delay line are employed to coincidence gate a logic element 29. In other words, AND gate 29 is switched to, and maintained in, a preselected state during the coincidence of the several inputs thereto, corresponding to a received echo from a clutter source or other target having a radial extent at least as large as that represented by the sum of such inputs. Such logic output may be employed by an OR gate 30 (in FIG. 1), either alternatively to, or in addition to, the output of notch filter 16 for mode switching purposes. Such alternative input may be of special utility in the case of a radar system mounted on a helicopter which is temporarily in hovering flight. In such case, the lack of significant relative motion between the helicopter and the terrain would prevent the spectral spread shown as cusp 22 in FIG. 1, and hence the notch filter would not function to discriminate clutter from a moving target return until the helicopter resumed forward flight.

Although spatial discriminator 20 has been described in terms of a tapped delay line element cooperating with an AND gate, it is clear that such description is exemplary only and that other structural equivalents may be employed, such as, for example, a three-bit shift register in cooperation with AND gate 29.

Accordingly, it is to be appreciated that there has been described mode-switching means in a non-coherent doppler processor for dtermining the presence of at least one of a preselected spectral condition and a preselected radial extent condition, indicative of a substantially clutter-referenced signal state. Hence, a non-coherent doppler processor is achieved which retains the advantages of non-coherent processing and avoids the motion-compensation requirements of a coherent doppler processor, which also avoiding the disadvantages of prior-art non-coherent doppler switching mode devices. Therefore, an improved non-coherent doppler processor is provided.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A device having an input terminal adapted to be connected to a non-coherent doppler signal processor for providing a substantially clutter-free target signal and comprising:

means responsively coupled to said terminal for determining the presence of at least one of a preselected spectral condition and a preselected radial extent condition, indicative of a substantially clutter-referenced signal state; and gated filter means reponsively coupled to said input terminal for providing a normally low-pass filtered output in the absence of a substantial clutter content in the input thereto, said gating means having a gating control input responsively coupled to an output of said first mentioned means for alternatively providing a high-pass filtered output during the presence of a substantial clutter content in the input thereto.

2. Means adapted to be responsive to a non-coherent doppler signal processor for providing a substantially clutter-free target signal for display purposes and comprising a normally gated-on low-pass filter means;

a normally gated-off high pass filter means; an input of each of said filter means commonly coupled to provide an input terminal; and notch filter means having a preselected center frequency corresponding to a frequency region intermediate the bandpass regions of said high-pass and low-pass filters, an input of said notch filter being coupled to said input terminal and an output thereof coupled to said gated filter means for providing gating signals for gating-off said low pass filter means and gating-on said high-pass filter means for the duration of said gating signals.

3. The device of claim 2 in which there is further provided signal combining means having a first and second input respectively coupled to the gated output of said first and second gated filter and an output adapted to be connected to a display indicator.

4. The device of claim 2 in which the preselected bandpass of said notch filter corresponds to the spectral edge of a clutter-referenced clutter signal component, and in which an upper corner frequency of said low pass filter is below said preselected bandpass.

5. The device of claim 2, in which there is further included radial extent discriminating means for gating said gated filter means, comprising OR logic output signalling means interposed between said gated filter means and the output of said notch filter, and AND logic output signalling means responsively coupled to an ungated output of said low pass filter for providing an output indicative of a clutter-referenced clutter return of at least three system pulsewidths in duration, an input of said OR logic means being responsively coupled to the output of said AND logic means.

6. In a non-coherent pulse type radar system for airborne use, including display means for displaying the situation of a detected target, means responsive to a non-coherent received signal for presenting a clutter-free signal for improved display of a detected target by said display means and comprising high-pass, low-pass and notch filter means, said filter means being commonly responsive to said non-coherently received signal, said low-pass filter means having a corner frequency substantially below a preselected upper corner-frequency of a clutter referenced clutter signal component, said high-pass filter means having a lower corner frequency above said preselected frequency, said notch filter means having a narrow bandpass, the center frequency of which is intermediate said upper and lower corner frequencies; and gating means coupled to the outputs of said low-pass and high-pass filters for normally gating-on the output of said low-pass filter and gating-off the output of said high-pass filter, and having a gating control input responsive to the output of said notch filter for gating-off the output of said low-pass filter and gating-on the output of the high-pass filter in response to output from said notch filter above a threshold level.

* * * * *